US011952715B2

(12) United States Patent
Palmer (10) Patent No.: US 11,952,715 B2
(45) Date of Patent: Apr. 9, 2024

(54) PROCESS OF TRANSFORMING WASTE MATERIAL INTO USEFUL MATERIAL

(71) Applicant: Bouldin Corporation, Morrison, TN (US)

(72) Inventor: David C. Palmer, Franklin, TN (US)

(73) Assignee: Bouldin Corporation, Morrison, TN (US)

( * ) Notice: Subject to any disclaimer, the term of this patent is extended or adjusted under 35 U.S.C. 154(b) by 691 days.

(21) Appl. No.: 17/066,681

(22) Filed: Oct. 9, 2020

(65) Prior Publication Data

US 2022/0112659 A1    Apr. 14, 2022

(51) Int. Cl.

| D21C 5/02 | (2006.01) |
| B02C 21/00 | (2006.01) |
| B03D 1/14 | (2006.01) |
| B09B 3/00 | (2022.01) |
| D21B 1/02 | (2006.01) |
| D21B 1/08 | (2006.01) |

(52) U.S. Cl.
CPC ............... *D21C 5/02* (2013.01); *B02C 21/00* (2013.01); *B03D 1/1468* (2013.01); *B09B 3/00* (2013.01); *D21B 1/026* (2013.01); *D21B 1/08* (2013.01)

(58) Field of Classification Search
CPC ........................................................ D21C 5/02
USPC ............................................................. 162/4
See application file for complete search history.

(56) References Cited

U.S. PATENT DOCUMENTS

| 5,558,281 A | 9/1996 | Bouldin et al. |
| 5,772,134 A | 6/1998 | Bouldin et al. |
| 6,017,475 A * | 1/2000 | Cantrell ................... B09B 3/00 264/211 |
| 7,101,164 B2 | 9/2006 | Bouldin |
| 7,303,160 B2 | 12/2007 | Bouldin et al. |
| 7,449,330 B2 | 11/2008 | Bouldin |
| 7,503,759 B2 | 3/2009 | Bouldin |
| 7,845,620 B1 | 12/2010 | Bouldin |
| 7,883,331 B2 | 2/2011 | Bouldin |
| 9,493,796 B2 | 11/2016 | Medoff et al. |
| 9,555,415 B2 | 1/2017 | Bouldin et al. |
| 9,562,322 B1 | 2/2017 | Post |
| 9,700,896 B1 * | 7/2017 | Gitschel ................. B07B 15/00 |

(Continued)

OTHER PUBLICATIONS

New Municipal Solid Waste Processing Technology Reduces Volume and Provides Beneficial Reuse Applications for Soil Improvement and Dust Control, Tolbert, et al (Year: 2011).*

(Continued)

*Primary Examiner* — Jacob T Minskey
(74) *Attorney, Agent, or Firm* — Lucian Wayne Beavers; Patterson Intellectual Property Law, PC (57) ABSTRACT

In a process for transforming waste material into useful material, a quantity of waste material such as household garbage or municipal solid waste is provided. The waste material is pre-shredded into pre-shredded waste material. The pre-shredded waste material is processed to at least partially remove one or more selected material components, thereby providing a processed pre-shredded waste material. The processed pre-shredded waste material is then secondarily shredded into secondarily shredded waste material which is then hydrolyzed under pressure greater than ambient pressure to create an aggregate cellulose pulp.

16 Claims, 5 Drawing Sheets

(56) References Cited

U.S. PATENT DOCUMENTS

2012/0048975 A1    3/2012   Gitschel

OTHER PUBLICATIONS

Office Action for corresponding Canada patent application No. 3,096,954, dated Aug. 5, 2022, 6 pages.
Office Action for corresponding Canada patent application No. 3,096,954, dated Feb. 10, 2023, 7 pages.
European Patent Office search report for corresponding patent application EP 21 20 0383, dated Feb. 23, 2022, 7 pages (not prior art).
ERDC/CERL TR-08-13, "Hydrothermal Processing of Base Camp Solid Wastes To Allow Onsite Recycling", US Army Corps of Engineers (Sep. 2008)(41 pages).
General Kinematics De-Stoner Air Classifier (undated but admitted to be prior art)(1 page).
A-S-H Submerged Chain Conveyor System (2016)(4 pages).
Steinert Nes Non-Ferrous Metal Separator (undated but admitted to be prior art)(6 pages).
SPYDIR-R NRT (undated but admitted to be prior art)(2 pages).
Uni-Shear SR900 Product Overview SSI (undated but admitted to be prior art)(4 pages).
Dual-Shear by SSI (undated but admitted to be prior art)(4 pages).
Fig. 1 of the present application is admitted to be prior art.

\* cited by examiner

PROCESS OF TRANSFORMING WASTE MATERIAL INTO USEFUL MATERIAL

FIELD OF THE DISCLOSURE

The present disclosure relates to processes for transforming waste material, such as household garbage or municipal solid waste (MSW), into useful material.

BACKGROUND OF THE DISCLOSURE

1. Description of the Prior Art

One prior process of transforming household garbage into useful material is described in U.S. Pat. No. 6,017,475 assigned to Bouldin Corporation, the assignee of the present application, the details of which are incorporated herein by reference. The process described in the '475 patent evolved into the WastAway® process commercialized by Bouldin Corporation.

Figure 1:
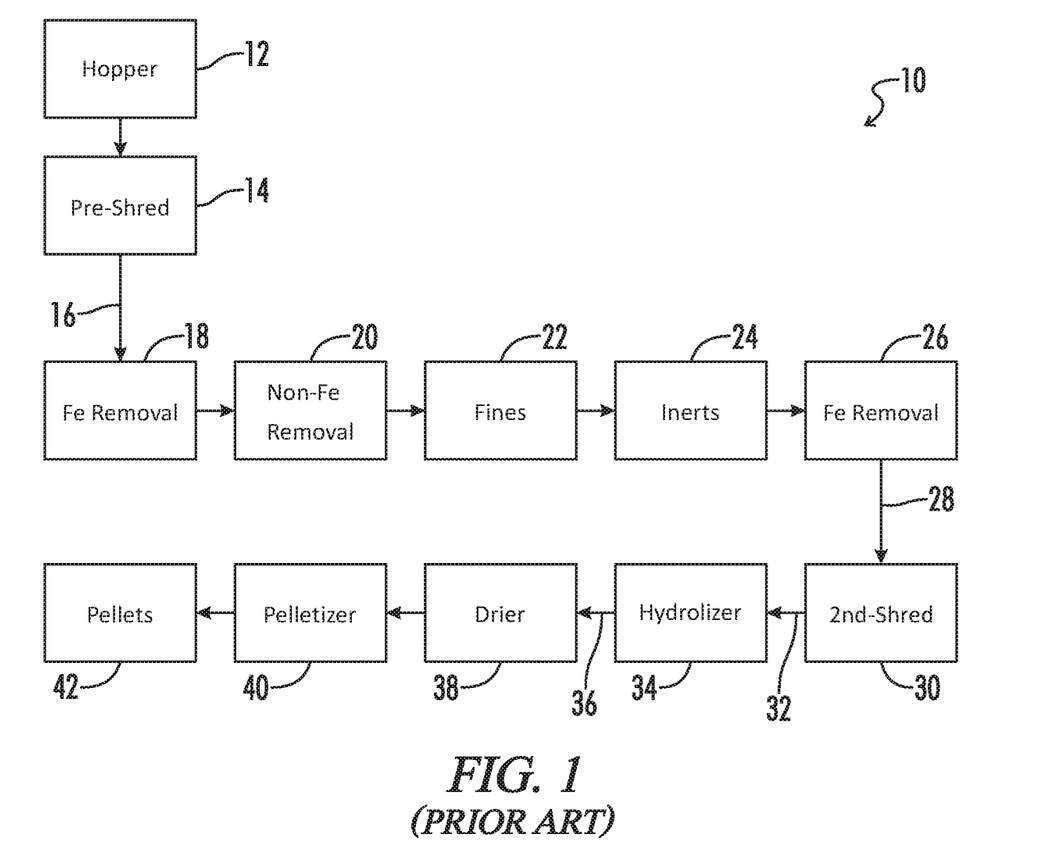
FIG. 1 is a flow chart for a prior art process.

FIG. 1 of the present disclosure schematically illustrates in process flow chart format one prior art version of the WastAway® process which is indicated by the numeral 10. The waste material was placed in a hopper 12 from which it was fed to a primary shredder 14 in which the waste material was pre-shredded into pre-shredded waste material 16 having a nominal maximum piece size of about 4 inches.

The pre-shredded waste material 16 was then passed through a first ferrous material separator 18 which removed at least a portion of the ferrous material from the pre-shredded waste material. The ferrous metal separator 18 was a belt magnet from Walker Magnetics.

The pre-shredded waste material then passed through a non-ferrous metal separator 20 in which at least a portion of the non-ferrous metal material, such as for example fragments of aluminum cans, was removed from the pre-shredded waste material.

Next the pre-shredded waste material was passed through a fines separator 22 which was configured as a one-quarter inch finger screen. The fines separator 22 was a Model JN 1555 star screener, from Continental Biomass Industries (CBI).

The larger size fraction from the fines separator 22 was then passed through an inerts separator 24 which was configured as an air density separator configured to separate the pre-shredded waste material into a heavier piece stream and a lighter piece stream. The inerts separator 24 was a Model JO35324 from General Kinematics.

The lighter piece stream from the inerts separator 24 was then passed through a second ferrous material separator 26 which removed at least a portion of the ferrous material from the pre-shredded waste material. The second ferrous metal separator 26 was a belt magnet from Walker Magnetics.

Next the processed pre-shredded waste material 28 went to a secondary shredder 30 which further shredded the processed pre-shredded waste material into a secondarily shredded waste material 32 having a nominal maximum piece size of about one inch.

The secondarily shredded waste material from secondary shredder 30 then went through a hydrolyzer 34 in which the secondarily shredded waste material was hydrolyzed under pressure greater that ambient pressure to create an aggregate cellulose pulp 36. The hydrolyzer 34 was constructed and operated generally in the manner described in U.S. Pat. No. 6,017,475.

The aggregate cellulose pulp 36 was then passed through a dryer 38 and a pelletizer 40 in which it was formed into pellets schematically indicated at 42. In the process 10 of FIG. 1, wherein the primary shredder 14 pre-shredded the waste material into pre-shredded waste material 16 having a nominal maximum piece size of about 4 inches, many common components of the waste material such as ferrous and non-ferrous cans, plastic bottles, and the like, were shredded into pieces in the primary shredder 14, and thus subsequent removal of those components from the stream of pre-shredded waste material involved the removal of these pieces.

2. Summary of the Disclosure

The present disclosure provides numerous improvements as compared to the prior art process of FIG. 1.

In one aspect these improvements involve a change in the size of material reduction in the primary shredder, such that nominal maximum piece size of the pre-shredded waste material exiting the primary shredder is much larger than was the material of the prior art process of FIG. 1. This allows many of the components of the waste material such as many of the ferrous and non-ferrous cans, plastic bottles, and the like, to pass through subsequent processing steps as substantially complete containers, or at least as much larger container pieces.

In another aspect these improvements involve numerous changes in the further processing steps downstream of the primary shredder, which take advantage of this larger nominal maximum piece size of the pre-shredded waste material to remove those substantially complete containers or much larger container pieces from the stream of pre-shredded waste material more efficiently that could be done in the prior art process of FIG. 1.

And in another aspect, many of these improvements in further processing steps downstream of the primary shredder are applicable even without a change in the size of material reduction in the primary shredder.

In one embodiment of a process for transforming waste material into useful material, the process may comprise steps of:
(a) providing a quantity of waste material;
(b) pre-shredding the waste material into pre-shredded waste material having a nominal maximum piece size of at least about 6 inches;
(c) processing the pre-shredded waste material to at least partially remove one or more selected material components, thereby providing a processed pre-shredded waste material;
(d) secondarily shredding the processed pre-shredded waste material into a secondarily shredded waste material having a nominal maximum piece size no greater than about 2 inches; and
(e) hydrolyzing the secondarily shredded waste material under pressure greater than ambient pressure to create an aggregate cellulose pulp.

In a preferred embodiment of the above process, in step (b) the waste material may be pre-shredded into pre-shredded waste material having a nominal maximum piece size of about 8 inches.

In a further preferred embodiment of the above processes in step (d) the processed pre-shredded waste material is secondarily shredded into a secondarily shredded waste material having a nominal maximum piece size of about one inch.

In another embodiment of a process for transforming waste material into useful material, the process may comprise steps of:

(a) providing a quantity of waste material;
(b) pre-shredding the waste material into pre-shredded waste material having a first maximum piece size;
(c) processing the pre-shredded waste material to provide a processed pre-shredded waste material, the processing step including:
   (c)(1) removing at least a portion of any ferrous materials from the pre-shredded waste material;
   (c)(2) separating the pre-shredded waste material into a smaller piece stream and larger piece stream with a primary separator;
   (c)(3) downstream of the primary separator separating at least a portion of the larger piece stream with a 2D/3D separator into a stream of substantially two-dimensional pieces and a stream of substantially three-dimensional pieces;
   (c)(4) downstream of the 2D/3D separator, removing at least one further selected material component from the stream of substantially three-dimensional pieces;
(d) secondarily shredding the processed pre-shredded waste material into a secondarily shredded waste material having a second maximum piece size smaller than the first maximum piece size; and
(e) hydrolyzing the secondarily shredded waste material under pressure greater than ambient pressure to create an aggregate cellulose pulp.

Numerous objects, features and advantages of the present invention will be readily apparent to those skilled in the art upon a reading of the following disclosure when taken in conjunction with the accompanying drawings.

DETAILED DESCRIPTION

Figure 2:
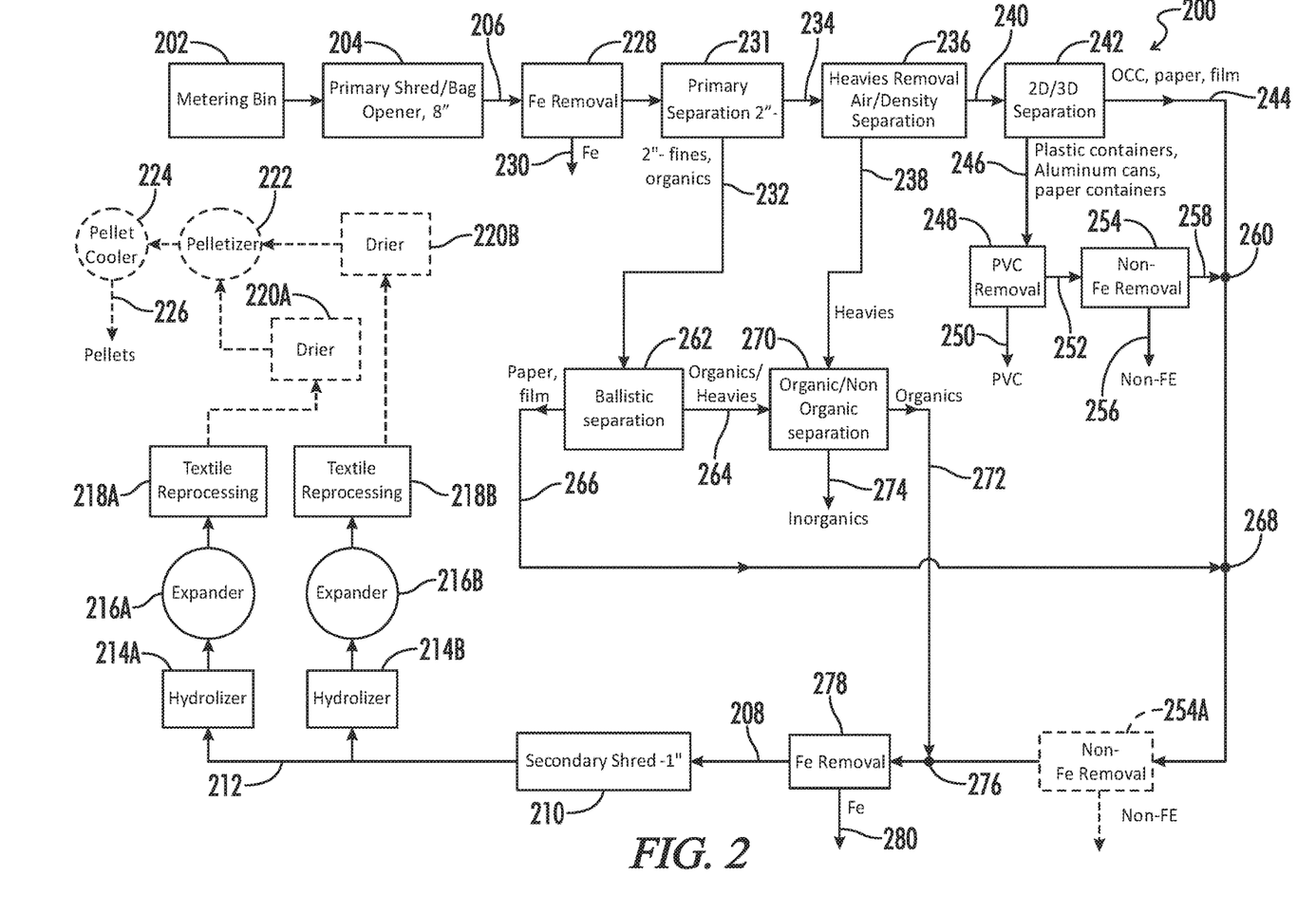
FIG. 2 is a flow chart for a first embodiment of an improved process.

A first embodiment of the improved processes disclosed herein is schematically illustrated in FIG. 2 and designated by the numeral 200. The process 200 is a process for transforming waste material such as household garbage or municipal solid waste (MSW) into a useful material. In this case the useful material is a pelletized cellulose material such as generally described in U.S. Pat. No. 6,017,475 which is incorporated herein by reference.

The process 200 begins by providing a quantity of this waste material into a metering bin 202. The metering bin 202 is available from Green Machine of Whitney Point, NY The metering bin 202 moves the waste material at a relatively constant flow rate into a primary shredder 204.

The primary shredder 204 is designed to pre-shred the waste material into pre-shredded waste material 206 having a nominal maximum piece size of at least about 6 inches, more preferably having a nominal maximum piece size of at least about 7 inches, even more preferably having a nominal maximum piece size of at least about 8 inches, and most preferably a nominal maximum piece size of about 8 inches. The primary shredder 204 also functions as a bag opener to tear open the typical plastic garbage bags in which much household garbage is bagged for municipal garbage collection. The primary shredder 204 may for example be of the type generically referred to as a "low speed high torque" shredder. One example of a suitable primary shredder is a Model M100E shredder available from SSI Shredding Systems.

As used herein the term "nominal maximum piece size" in the context of a shredder refers to the nominal dimension to which a given shredder is designed reduce larger articles. It will be understood that many shredded fragments may be smaller than the "nominal maximum piece size" and a few may even be a bit larger than the "nominal maximum piece size". The "nominal maximum piece size" is a determined by the physical design of the shredder. Thus commercial shredders are often referred to as a two-inch shredder, or a four-inch shredder, or an eight inch shredder, with reference to their "nominal maximum piece size". Similarly the term "nominal maximum piece size" in the context of a separator refers to the nominal maximum dimension of the smallest pieces that are allowed to pass into the smaller piece stream from the separator.

The pre-shredded waste material 206 is then put through a sequence of processing steps design to at least partially remove one or more selected material components, thereby providing a processed pre-shredded waste material 208 which then passes through a secondary shredder 210.

The secondary shredder 210 is designed to secondarily shred the processed pre-shredded waste material 208 into a secondarily shredded waste material 212 having a nominal maximum piece size of no greater than about two inches and more preferably a nominal maximum piece size of no greater than about one inch. The secondary shredder 210 may for example be of the type generically referred to as a "low speed high torque" shredder. One example of a suitable secondary shredder 210 is a Model SR900E shredder available from SSI Shredding Systems.

The secondarily shredded waste material 212 then passes through either of two parallel hydrolyzers 214A and 214B, then expanders 216A and 216B, then textile processing stations 218A and 218B, and then dryers 220A and 220B. From the dryers 220A and 220B the material flows to pelletizer 222 and then to pellet cooler 224 from which it exits in the form of pellets 226. The hydrolyzers 214A and 214B hydrolyze the secondarily shredded waste material 212 under pressure greater than ambient pressure to create an aggregate cellulose pulp in the manner generally described in U.S. Pat. No. 6,017,475. Other details of suitable hydrolyzer constructions are shown in U.S. Pat. Nos. 7,303,160; 7,883,331; and 9,555,415; the details of which are incorporated herein by reference. The textile processing stations 218A and 218B may be constructed in accordance with the teachings of U.S. Pat. No. 9,562,322 the details of which are incorporated herein by reference.

The various processing steps of process 200 between the primary shredder 204 and the secondary shredder 210 are designed to remove ferrous and non-ferrous metals, and polyvinylchloride (PVC) plastics from the material stream for recycling. Also inorganic materials such as rocks are removed. In addition to better capturing valuable materials for recycling, the quality of the remaining material stream is improved as a feed material for the hydrolyzers.

These processing steps may begin by passing the pre-shredded waste material 206 from primary shredder 204 through a ferrous material separator 228 which removes at least a portion of the ferrous material present in the pre-shredded waste material 206 for recycling. The removed ferrous material is indicated at 230. The ferrous material separator 228 may for example be of the type generically referred to as a "drum magnet" separator. One example of a suitable ferrous material separator 228 is a drum magnet separator available from Eriez Manufacturing Co.

Next the pre-shredded waste material 206 passes through a primary separator 231 which separates the pre-shredded waste material 206 into a smaller piece stream 232 and a larger piece stream 234. The smaller piece stream 232 is often referred to as a "fines" stream. The primary separator 231 is constructed such that the smaller piece stream 232 has a nominal maximum piece size in a range of from about 1 inch to about 3 inches, and preferably the nominal maximum piece size is about 2 inches. The primary separator 231 may for example be of the type generically referred to as a "disc screen" separator. One example of a suitable primary separator 231 is a glass breaker and fines removal separator available from Green Machine of Whitney Point, NY.

The larger piece stream 234 goes to a second separator 236 which separates the larger piece stream 234 into a heavier piece stream 238 and a lighter piece stream 240. The second separator 236 may for example be of the type generically referred to as an air/density separator. One example of a suitable second separator 236 is a Model DEST-F 48×17.5 PARA-MOUNT II® DE-STONER separator available from General Kinematics.

The lighter piece stream 240 is then passed to a 2D/3D separator 242 which separates the lighter piece stream 240 into a stream 244 of substantially two-dimensional pieces and a stream 246 of substantially three-dimensional pieces. The substantially two-dimensional pieces may for example include cardboard, office paper, plastic film, and the like. The substantially three-dimensional pieces may for example include plastic containers, aluminum cans, paper box containers, and the like. The 2D/3D separator 242 may for example be of the type generically referred to as a "disc screen" separator. One example of a suitable 2D/3D separator 242 is a polishing screen available from Green Machine.

The stream 246 of substantially three-dimensional pieces goes to a PVC separator 248 which removes PVC pieces from the stream 246. The PVC separator may 248 for example be of the type generically referred to as an optical sorter which analyzes electromagnetic energy reflected from the pieces to identify those pieces made of PVC, and then sorts the PVC pieces from the other components of the stream 246 of substantially three-dimensional pieces. One example of a suitable optical sorter for the PVC separator 248 is a Model SpydIR-R separator available from NRT/Bulk Handling Systems. The PVC pieces removed from the stream are indicated at 250. That PVC material 250 will typically be bundled and sold as recycled material. It is noted that other selected plastic containers could also be removed by an optical sorter at this position in the process.

The remaining substantially three-dimensional pieces exit the PVC separator 248 in stream 252 and pass to a non-ferrous metal separator 254. Non-ferrous three-dimensional objects, which may for example be aluminum cans, are removed as indicated at 256. The non-ferrous articles will also typically be sold as recycled material. The non-ferrous metal separator 254 may for example be of the type generically referred to as an "eddy current" separator. One example of a suitable non-ferrous metal separator 254 is available from STEINERT Elektromagnetbau GmbH. It is noted that an alternative location for the non-ferrous metal separator 254 is shown in dashed lines and indicated by the number 254A.

The remainder 258 of the substantially three-dimensional pieces are rejoined with the stream of substantially two-dimensional pieces at junction 260. It is noted that by separating out the stream 244 of substantially two-dimensional pieces the sorting performed by PVC sorter 248 and non-ferrous metal sorter 254 is made much more efficient because the two-dimensional pieces are no longer present to clog these sorters or to cover up the substantially three-dimensional pieces which are being sorted.

The smaller piece stream 232 from primary separator 231 passes into a third separator 262 which separates the smaller piece stream 232 into a heavier piece stream 264 and a lighter piece stream 266. The lighter piece stream 266 rejoins the processed substantially two-dimensional pieces and substantially three-dimensional pieces at junction 268. The heavier piece stream 264 flows into an organic/inorganic separator 270. The heavier piece stream 238 from second separator 236 also flows into the organic/inorganic separator 270. The organic/inorganic separator 270 separates the two heavier piece streams 264 and 238 into an organics stream 272 comprising primarily organic material and an inorganics stream 274 comprising primarily inorganic material. The inorganics stream 274 typically is made up of rocks and other such debris which is discarded. The organics stream 272 includes material such as food waste which is combined with the other processed components at junction 276.

Figure 5:
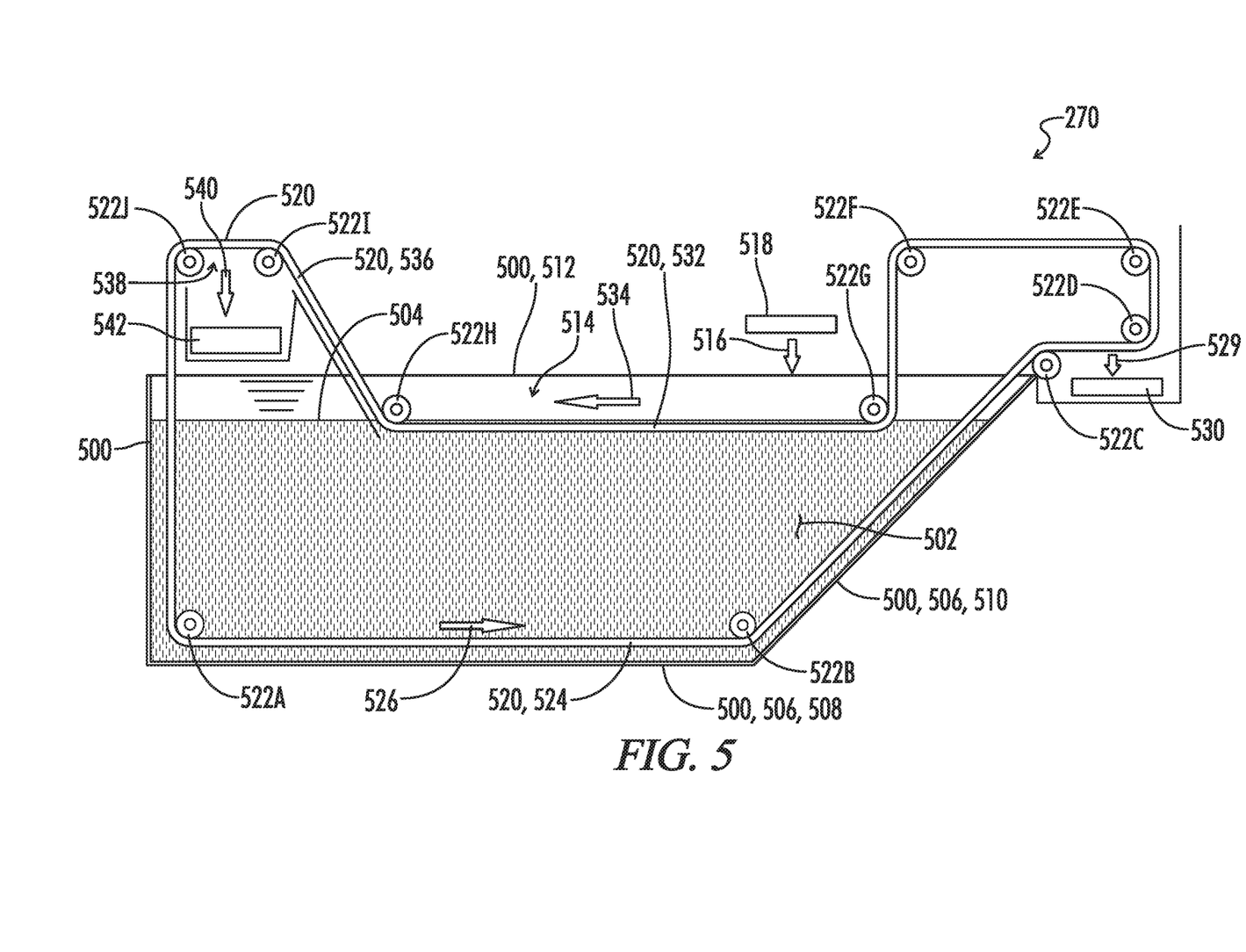
FIG. 5 is a schematic illustration of a water bath separator for separating organic material from inorganic material.

The organic/inorganic separator 270 may for example be a water bath separator configured such that organic materials float to the surface of the water bath and inorganic materials sink to the bottom of the water bath. The details of construction of one example of such a water bath separator are shown in FIG. 5 and further described below.

The processed pre-shredded materials 208 flowing from junction 276 toward the secondary shredder 210 include the stream 244 of substantially two-dimensional pieces, the stream 258 of remaining substantially three-dimensional pieces, the lighter piece stream 266 and the organics stream 272.

In one final processing step a second ferrous material separator 278 immediately upstream of the secondary shredder 210 separates at least a portion of any remaining ferrous material from the material stream 208 otherwise entering the secondary shredder 210. The removed ferrous material is indicated at 280.

Figure 3:
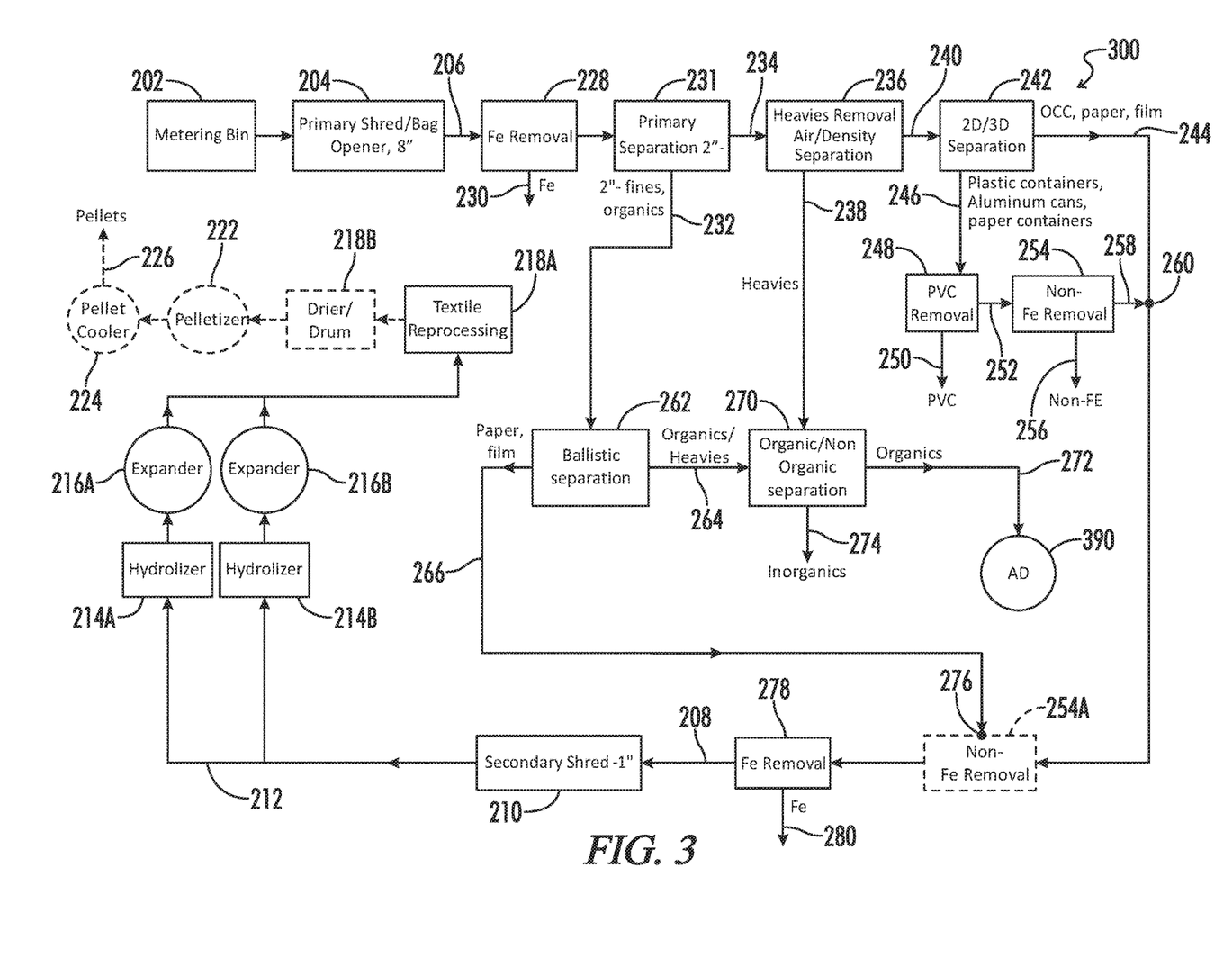
FIG. 3 is a flow chart for a second embodiment of an improved process.

FIG. 3 Embodiment

A second embodiment of the improved processes disclosed herein is schematically illustrated in FIG. 3 and designated by the numeral 300. The process 300 is in large part similar to the process 200 and like steps are identified by the same numbers used in FIG. 2 and their descriptions will not be repeated.

The primary difference of the process 300 is that the organics stream 272 is directed to an anaerobic digester 390 instead of being recombined with the rest of the processed pre-shredded material stream. The anaerobic digester 390 converts the organic material of stream 272 into biogas in a known process through which bacteria break down the organic matter.

Also in FIG. 3 the two dryers 218A and 218B are placed in series instead of in parallel.

Figure 4:
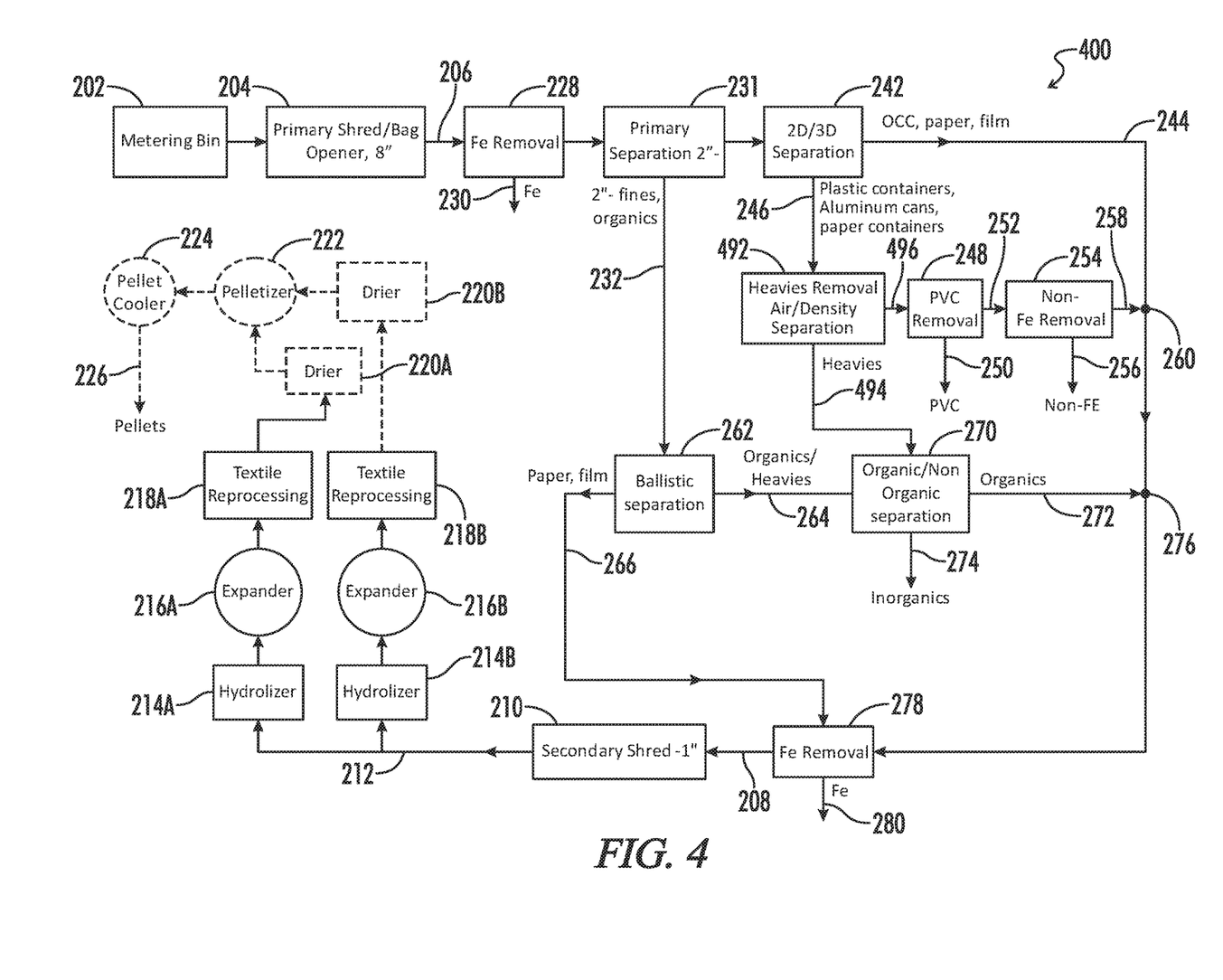
FIG. 4 is a flow chart for a third embodiment of an improved process.

FIG. 4 Embodiment

A third embodiment of the improved processes disclosed herein is schematically illustrated in FIG. 4 and designated by the numeral 400. The process 400 is in large part similar to the process 200 and like steps are identified by the same numbers used in FIG. 2 and their descriptions will not be repeated.

The primary difference in the process 400 is that the second separator 236 of FIG. 2 between the primary separator 231 and the 2D/3D separator 242 has been removed, and a similar second separator 492 has been placed between the 2D/3D separator 242 and the organic/inorganic separator 270. The second separator 492 separates the stream 246 of substantially three-dimensional pieces into a heavier piece stream 494 and a lighter piece stream 496. The heavier piece stream 494 flows to the organic/inorganic separator 270 where it is treated along with the heavier piece stream 264 from the third separator 262. The lighter piece stream 496 which includes the bulk of the stream of substantially three-dimensional pieces flows to the PVC separator 248 where it is treated as previously described. The second separator 492 may for example be of the type generically referred to as an air/density separator. One example of a suitable second separator 492 is a Model DEST-F 48×17.5 PARA-MOUNT II® DE-STONER separator available from General Kinematics.

The Water Bath Separator of FIG. 5

One example of the water bath separator 270 is schematically shown in FIG. 5. Separator 270 includes a flotation tank 500 configured to receive a volume of water 502 filling the tank 500 to a water surface level 504. The tank 500 includes a tank bottom 506 including a horizontal portion 508 and a ramp portion 510.

The tank 500 may have an open top 512 defining a tank inlet 514 for receiving a mixture 516 of less dense organic material and more dense inorganic material from one or more infeed conveyors 518. In the embodiment of FIGS. 2 and 3 the one or more infeed conveyors 518 may carry the incoming streams 238 and 264. In the embodiment of FIG. 4 the one or more infeed conveyors 518 may carry the incoming streams 264 and 494. The operating principle of the water bath separator 270 is that the less dense organic material tends to float on or near the water surface 504, and the more dense inorganic material tends to sink to the tank bottom 506, 508.

An endless conveyor 520, which may be a chain and flight type conveyor or any other suitable type conveyor, is received in the tank 500 and runs about a plurality of roller guides 522A-522J. The conveyor 520 includes a lower conveyor run 524 extending from roller guide 522A to roller guide 522D and runs in the direction generally indicated at 526. The lower conveyor run 524 extends generally parallel to and closely adjacent to the tank bottom 506 so that the flights of the chain and flight conveyor push accumulated more dense inorganic material from left to right in FIG. 5 across the horizontal portion 508 of tank bottom then up the ramp portion 510 of tank bottom. After the lower conveyor run passes roller guide 522C the conveyor passes over a downwardly open inorganic material discharge outlet 528 that allows the inorganic material, generally indicated at 529, to drop out of the conveyor 520 onto an inorganics discharge conveyor 530.

The endless conveyor 520 further includes an upper conveyor run 532 extending from roller guide 522G to roller guide 522J and moving generally in the direction indicated by arrow 534. Thus with reference to FIG. 5 the endless conveyor 520 runs in a loop in a counterclockwise direction. The upper conveyor run 532 extends generally parallel to and closely adjacent to the water surface 504, so that the flights of the chain and flight conveyor push accumulated less dense organic material from right to left in FIG. 5 across the water surface 504 then up an upper conveyor ramp portion 536. After the upper conveyor run 532 passes roller guide 522I the conveyor passes over a downwardly open organic material discharge outlet 538 that allows the organic material, generally indicated at 540, to drop out of the conveyor 520 onto an organics discharge conveyor 542.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims Each disclosed feature or embodiment may be combined with any of the other disclosed features or embodiments.

What is claimed is:

1. A process for transforming waste material into useful material, the process comprising steps of:
   (a) providing a quantity of waste material;
   (b) pre-shredding the waste material into pre-shredded waste material having a nominal maximum piece size of at least about 6 inches;
   (c) processing the pre-shredded waste material to at least partially remove one or more selected material components, thereby providing a processed pre-shredded waste material;
   (d) secondarily shredding the processed pre-shredded waste material into a secondarily shredded waste material having a nominal maximum piece size no greater than about 2 inches; and
   (e) hydrolyzing the secondarily shredded waste material under pressure greater than ambient pressure to create an aggregate cellulose pulp.

2. The process of claim 1, wherein:
   in step (b) the waste material is pre-shredded into pre-shredded waste material having a nominal maximum piece size of at least about 8 inches.

3. The process of claim 2, wherein:
   in step (d) the secondarily shredded waste material has a nominal maximum piece size no greater than about 1 inch.

4. The process of claim 1, wherein the processing step (c) further comprises:
   separating the pre-shredded waste material into a smaller piece stream and larger piece stream with a primary separator.

5. The process of claim 4, wherein the processing step (c) further comprises:
   downstream of the primary separator, separating the smaller piece stream into heavier piece stream and a lighter piece stream.

6. The process of claim 4, wherein:
   the smaller piece stream has a nominal maximum piece size in a range of from about 1 inch to about 3 inches.

7. The process of claim 6, wherein the processing step (c) further comprises:
   upstream of the primary separator, separating ferrous material from the pre-shredded waste material.

8. The process of claim 6, wherein the processing step (c) further comprises:
   downstream of the primary separator separating at least a portion of the larger piece stream with a 2D/3D separator into a stream of substantially two-dimensional pieces and a stream of substantially three-dimensional pieces.

9. The process of claim 8 wherein the processing step (c) further comprises:
downstream of the primary separator and upstream of the 2D/3D separator separating the larger piece stream into heavier piece stream and a lighter piece stream, the lighter piece stream being directed to the 2D/3D separator.

10. The process of claim 9 wherein the processing step (c) further comprises:
separating the heavier piece stream into an organics stream comprising primarily organic material and an inorganics stream comprising primarily inorganic material with an organic/inorganic separator.

11. The process of claim 10, further comprising:
processing the organic stream in an anaerobic digester.

12. The process of claim 10, wherein:
the organic/inorganic separator includes a water bath separator configured to float the organic material away from the inorganic material.

13. The process of claim 10, wherein the processing step (c) further comprises:
directing the organic stream to the secondary shredder.

14. The process of claim 9, wherein the processing step (c) further comprises:
upstream of the secondary shredder, separating ferrous material from a material stream otherwise entering the secondary shredder.

15. The process of claim 9 wherein the processing step (c) further comprises:
removing polyvinylchloride (PVC) pieces from the stream of substantially three-dimensional pieces from the 2D/3D separator.

16. The process of claim 9 wherein the processing step (c) further comprises:
removing non-ferrous metal pieces from the stream of substantially three-dimensional pieces from the 2D/3D separator.

* * * * *